(12) United States Patent
Lyman

(10) Patent No.: US 7,824,296 B2
(45) Date of Patent: Nov. 2, 2010

(54) LOCKING DIFFERENTIAL HAVING A SPLIT-CENTER DRIVER

(75) Inventor: Randal A. Lyman, Everett, WA (US)

(73) Assignee: Ring and Pinion Service, Inc., Everett, WA (US)

(*) Notice: Subject to any disclaimer, the term of this patent is extended or adjusted under 35 U.S.C. 154(b) by 513 days.

(21) Appl. No.: 12/024,021

(22) Filed: Jan. 31, 2008

(65) Prior Publication Data

US 2009/0197732 A1    Aug. 6, 2009

(51) Int. Cl.
*F16H 48/20* (2006.01)
(52) U.S. Cl. .................................. 475/231; 475/235
(58) Field of Classification Search ............. 475/231, 475/235, 236, 240
See application file for complete search history.

(56) References Cited

U.S. PATENT DOCUMENTS

| | | | |
|---|---|---|---|
| 3,498,154 A | 3/1970 | Mueller-Berner |
| 3,732,752 A | 5/1973 | Louckes et al. |
| 3,913,414 A | 10/1975 | Freiburger |
| 4,043,224 A | 8/1977 | Quick |
| 4,186,625 A | 2/1980 | Chamberlain |
| 4,424,725 A | 1/1984 | Bawks |
| 4,555,962 A | 12/1985 | Bucarelli |
| 4,557,158 A | 12/1985 | Dissett et al. |
| 4,594,913 A | 6/1986 | Opitz |
| 4,644,818 A | 2/1987 | Choma et al. |
| 4,644,823 A | 2/1987 | Mueller |
| 4,665,769 A | 5/1987 | Parsons |
| 4,745,818 A | 5/1988 | Edwards et al. |
| 4,759,232 A | 7/1988 | Roberts |
| 4,901,599 A | 2/1990 | Irwin |
| 4,955,853 A | 9/1990 | Bausch |
| 4,959,043 A | 9/1990 | Klotz et al. |
| 4,976,667 A | 12/1990 | Goscenski |
| 5,171,192 A | 12/1992 | Schlosser et al. |
| 5,176,590 A | 1/1993 | Haydock |
| 5,350,340 A | 9/1994 | Paul et al. |
| 5,413,015 A | 5/1995 | Zentmyer |
| 5,524,509 A | 6/1996 | Dissett |
| 5,590,572 A | 1/1997 | Valente |
| 5,591,098 A | 1/1997 | Jones et al. |
| 5,715,733 A | 2/1998 | Dissett |
| 5,749,803 A | 5/1998 | Teraoka et al. |
| 5,836,220 A | 11/1998 | Valente |
| 5,947,859 A | 9/1999 | McNamara |
| 6,309,321 B1 | 10/2001 | Valente |

(Continued)

FOREIGN PATENT DOCUMENTS

EP    0198143 A1    10/1986

(Continued)

*Primary Examiner*—Ha D. Ho
(74) *Attorney, Agent, or Firm*—Black Lowe & Graham, PLLC

(57) ABSTRACT

A locking differential includes a housing with an interior chamber in which a two-piece split-center driver is located. The split-center driver is positioned on opposite sides of a cross-pin assembly. A pair of axially spaced output shafts extend from the interior chamber and are coupled to a pair of side gears. The split-center driver gear and a centered cam member are arranged co-axially about the adjacent ends of the output shafts, and annular clutch members are operable to disconnect an overrunning output shaft.

8 Claims, 6 Drawing Sheets

U.S. PATENT DOCUMENTS

| | | | |
|---|---|---|---|
| 6,394,927 B1 * | 5/2002 | Bongard | 475/231 |
| 6,432,020 B1 | 8/2002 | Rivera et al. | |
| 6,540,640 B2 * | 4/2003 | Hibbler et al. | 475/230 |
| 7,056,256 B2 | 6/2006 | Asahi | |
| 7,074,150 B2 * | 7/2006 | Fusegi et al. | 475/150 |
| 7,264,568 B2 * | 9/2007 | Ludwig et al. | 475/233 |
| 7,291,083 B2 * | 11/2007 | Almaguer | 475/221 |

FOREIGN PATENT DOCUMENTS

GB 2374858 A 10/2002

* cited by examiner

LOCKING DIFFERENTIAL HAVING A SPLIT-CENTER DRIVER

TECHNICAL FIELD

The present invention is generally directed toward a locking differential having a housing, gear members, and a set of cam members for automatically disengaging an overrunning output shaft.

BACKGROUND OF THE INVENTION

Conventional locking differentials operate to automatically disengage an overrunning output shaft from a drive mechanism. The conventional locking differentials include a center cam for disengaging the overrunning output shaft and includes rings, commonly referred to as holdout rings, for maintaining the output shaft in a disengaged state as long as the overrun condition persists. In addition, the conventional locking differentials includes a spacer located between adjacent ends of co-axial output shafts to resist the axial forces which tend to displace the output shafts towards each other. Several types of conventional locking differentials are described in U.S. Pat. No. 4,557,158 to Dissett et al.; U.S. Pat. No. 4,644,818 to Choma et al.; U.S. Pat. No. 4,745,818 to Edwards et al.; and, U.S. Pat. No. 5,590,572 to Valente.

SUMMARY OF THE INVENTION

In an example of the invention, a locking differential includes a two-piece split-center driver. The two-piece split-center driver was incorporated to provide an access window to allow installation or removal of any c-clips on the ends of the output shafts. The inclusion and configuration of the split-center driver may advantageously reduce unit costs and inventory costs with respect to assembling and maintaining the locking differential. In one embodiment, the locking differential includes the two-piece split-center driver positioned on opposite sides of a cross-pin assembly.

In one aspect of the invention, a locking differential for driving a pair of output shafts includes a housing having a main body portion coupled to a removable end portion to define an interior chamber. The pair of output shafts extends in opposite directions from the interior chamber. The main body portion includes a radial flange extending from a periphery of the main body portion and a pair of side gears is positioned within the interior chamber. A first side gear is concentrically coupled and rotationally fixed to one of the output shafts and a second side gear is concentrically coupled and rotationally fixed to the oppositely extending output shaft. A pair of clutch gear members are slideably coupled to the side gears, such that the pair of clutch gear members are axially movable to maintain the locking differential in a disengaged state when the locking differential is in an overrunning condition, which occurs when one output shaft overruns the oppositely extending output shaft by a predetermined amount.

The locking differential further includes a cross pin assembly having a cross pin extending through an opening in the main body portion of the housing and a cross pin support block positioned in a complementary shaped opening in the main body portion of the housing. Further, a two-piece split-center driver includes a first driver located on a first side of the cross pin assembly proximate the end portion of the housing and a second driver located on a second side of the cross pin assembly proximate the radial flange extending from the main body portion of the housing. A center cam member having an opening to receive the cross pin and co-axially aligned with the side gears and clutch gear members may cooperate with the pair of clutch gear members to disengage the side gears from the two-piece center driver when one of the output shafts is in the overrunning condition.

BRIEF DESCRIPTION OF THE DRAWINGS

Preferred and alternative embodiments of the present invention are described in detail below with reference to the following drawings.

DETAILED DESCRIPTION

Figure 1:
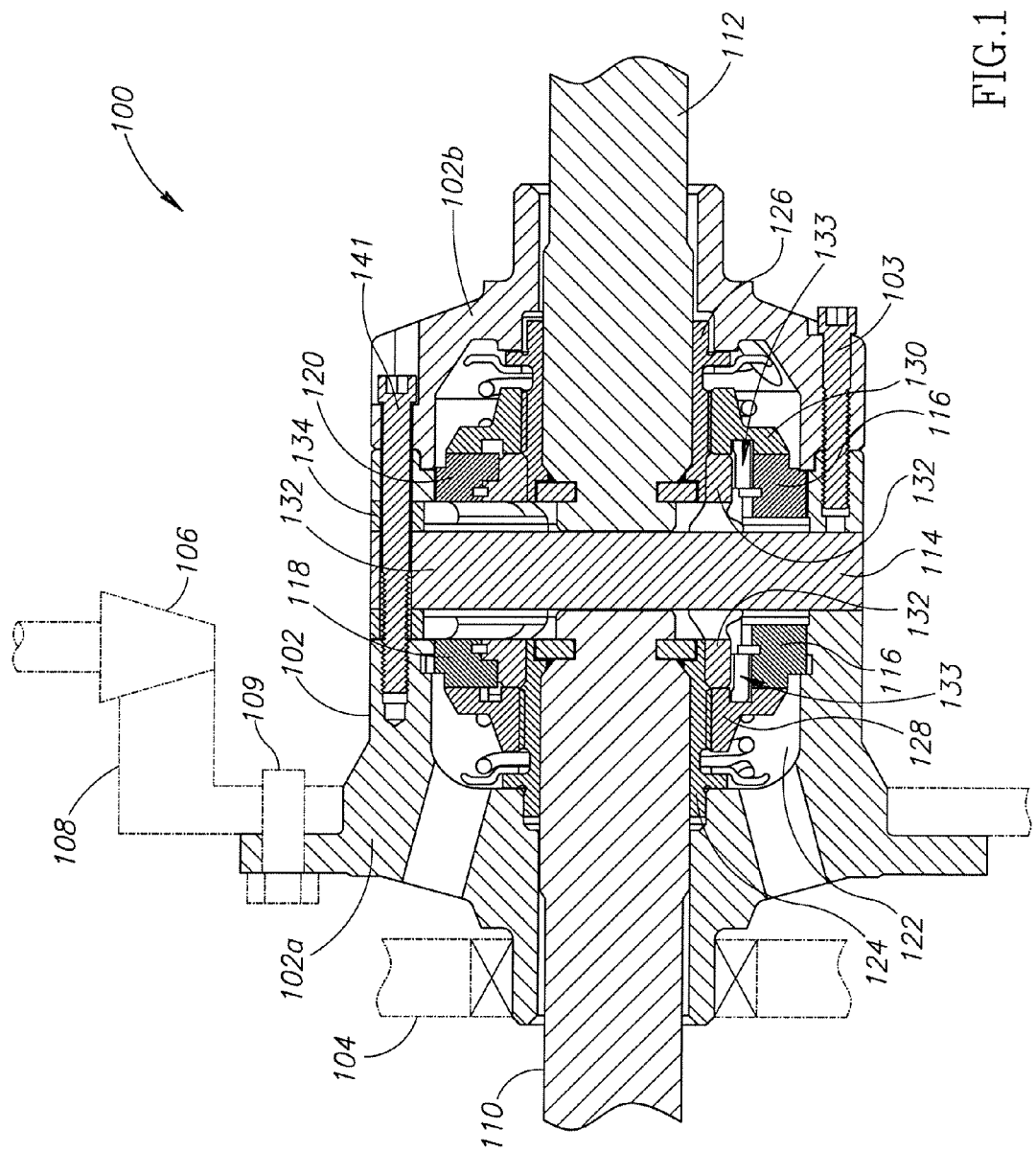
FIG. 1 is a cross-sectional view of a locking differential coupled to a casing and a ring gear, the locking differential having a split-center driver and a cross pin assembly according to an illustrated embodiment of the invention.
Figure 2:
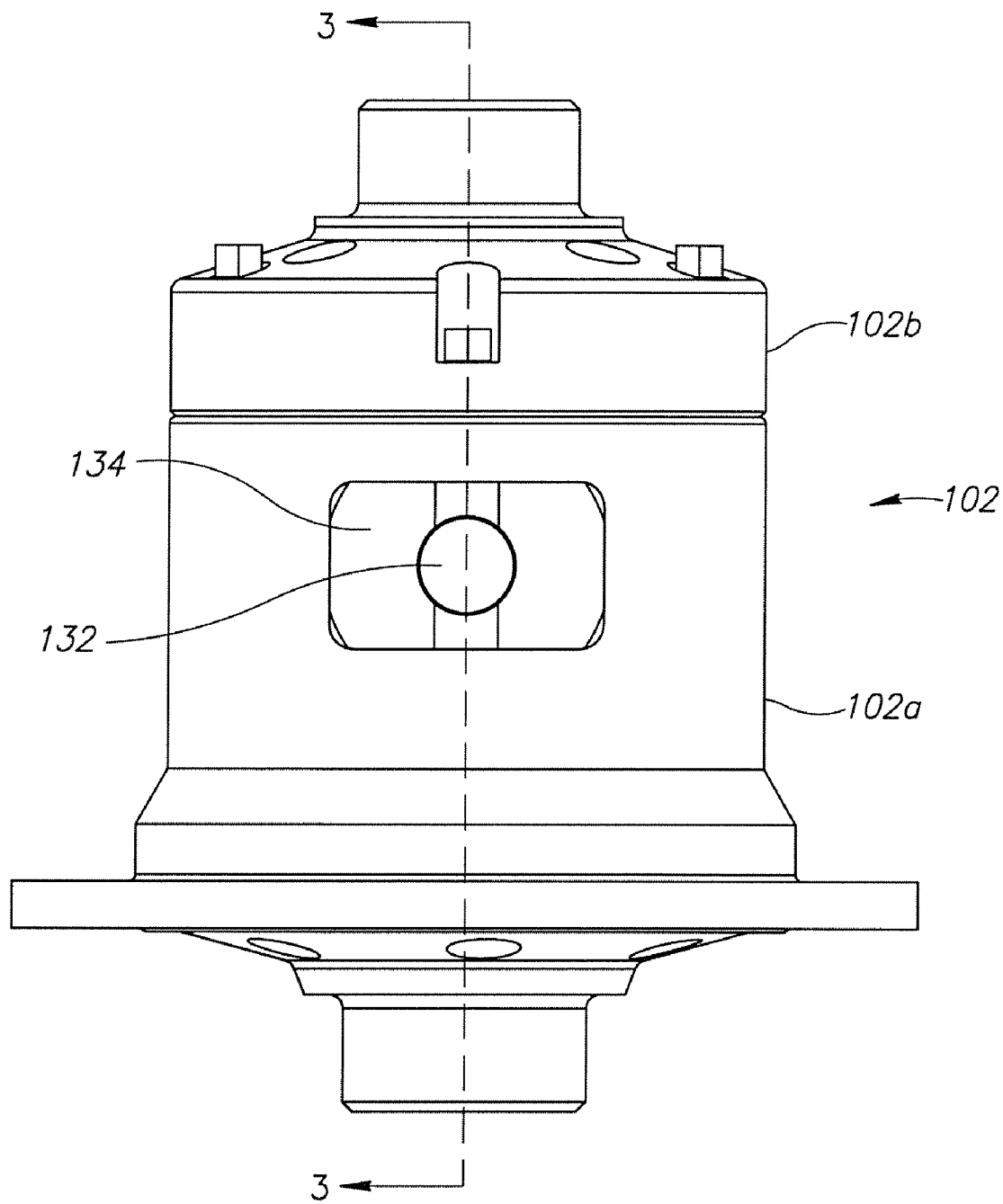
FIG. 2 is a side elevational view of locking differential of FIG. 1 having a two-piece split-center driver.
Figure 3:
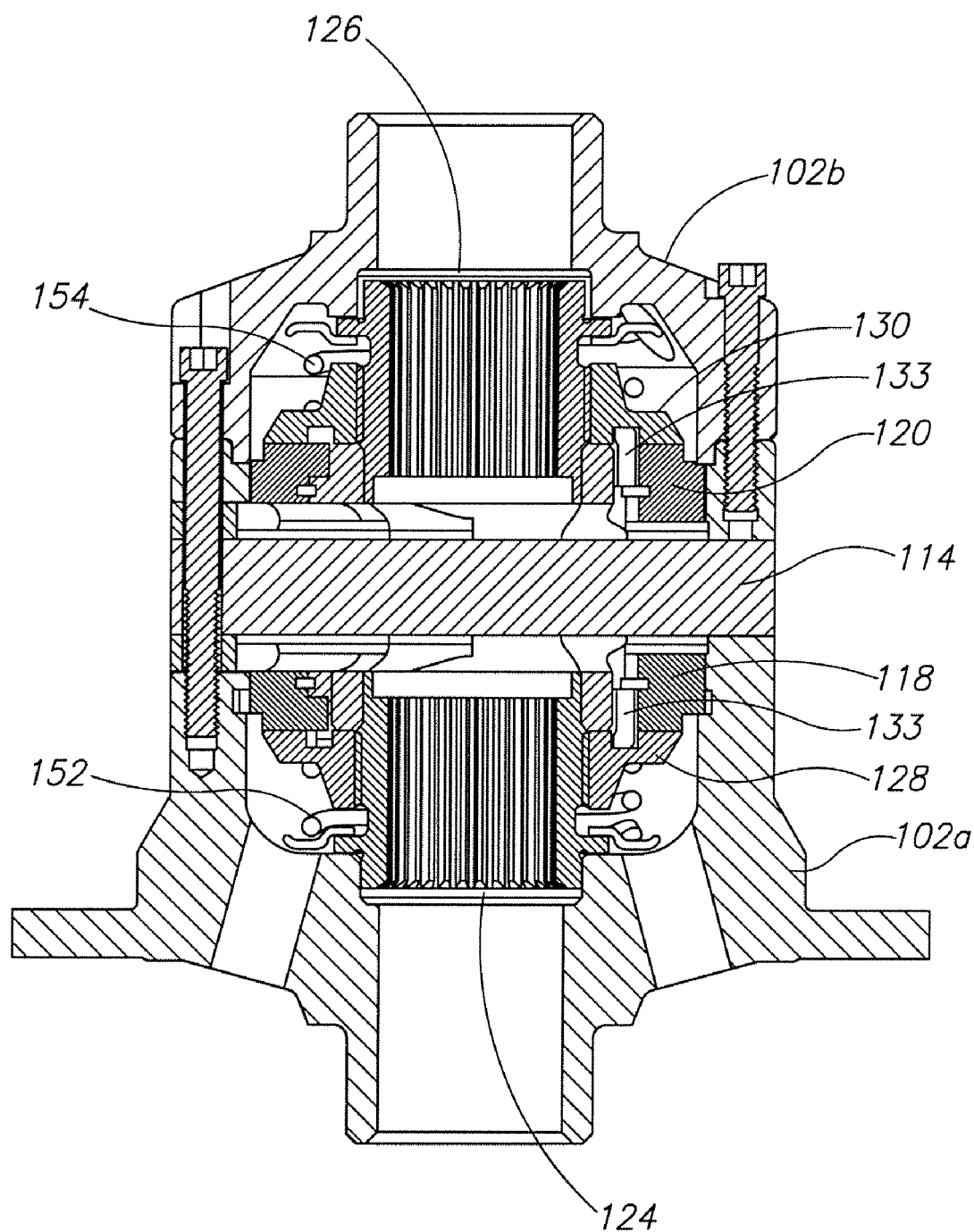
FIG. 3 is a cross-sectional view the locking differential of FIG. 2 taken along line 3-3 of FIG. 2.

FIGS. 1-3 show a locking differential 100 having a housing 102 rotationally coupled to a casing 104 according to an illustrated embodiment of the invention. A pinion gear 106 drives a ring gear 108, which in turn is coupled to the housing 102 using fasteners 109, such as bolts 109. In addition, the locking differential drives co-axially aligned output shafts 110, 112 that abut and extend outwardly from a cross pin assembly 114 located within the housing 102 and further located between a split-center driver 116, which includes a first driver 118 that cooperates with the output shaft 110 and a second driver 120 that cooperates with the output shaft 112. Additional details and advantages regarding the cross pin assembly 114 and the split-center driver 116 will be provided below. In the illustrated embodiments, like components retain their same reference numerals unless the components have been modified as part of an alternate embodiment in which they may then be provided with different reference numerals.

Figure 6:
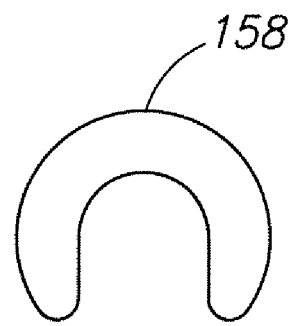
FIG. 6 is a top plan view of a clip for axially positioning the output shaft of FIG. 5 in the locking differential of FIG. 2 according to an illustrated embodiment of the invention.

The housing 102 includes a main body portion 102a and a removable end cap portion 102b. The main body portion 102a is coupled to the end cap portion 102b, for example with bolts 103, to define an interior chamber 122. In addition, a pair of side gears 124, 126 are rotationally fixed to portions of the output shafts 110, 112, as illustrated. In one embodiment, the side gears 124, 126 are rotationally fixed to the portions of the output shafts 110, 112 with complementary splines located on the side gears 124, 126 and on the portions of the output shafts 110, 112, respectively. By way of example, output shaft splines 127 are best shown in FIG. 6 on output shaft 110. A pair of clutch gear members 128, 130 are slideably coupled to the side gears 124, 126. FIG. 2 shows the cross pin assembly 114 having a cross pin 132 and a cross pin support block 134. Holdout rings 133 are used to hold clutch gear members 128, 130 in a disengaged state.

Figure 4:
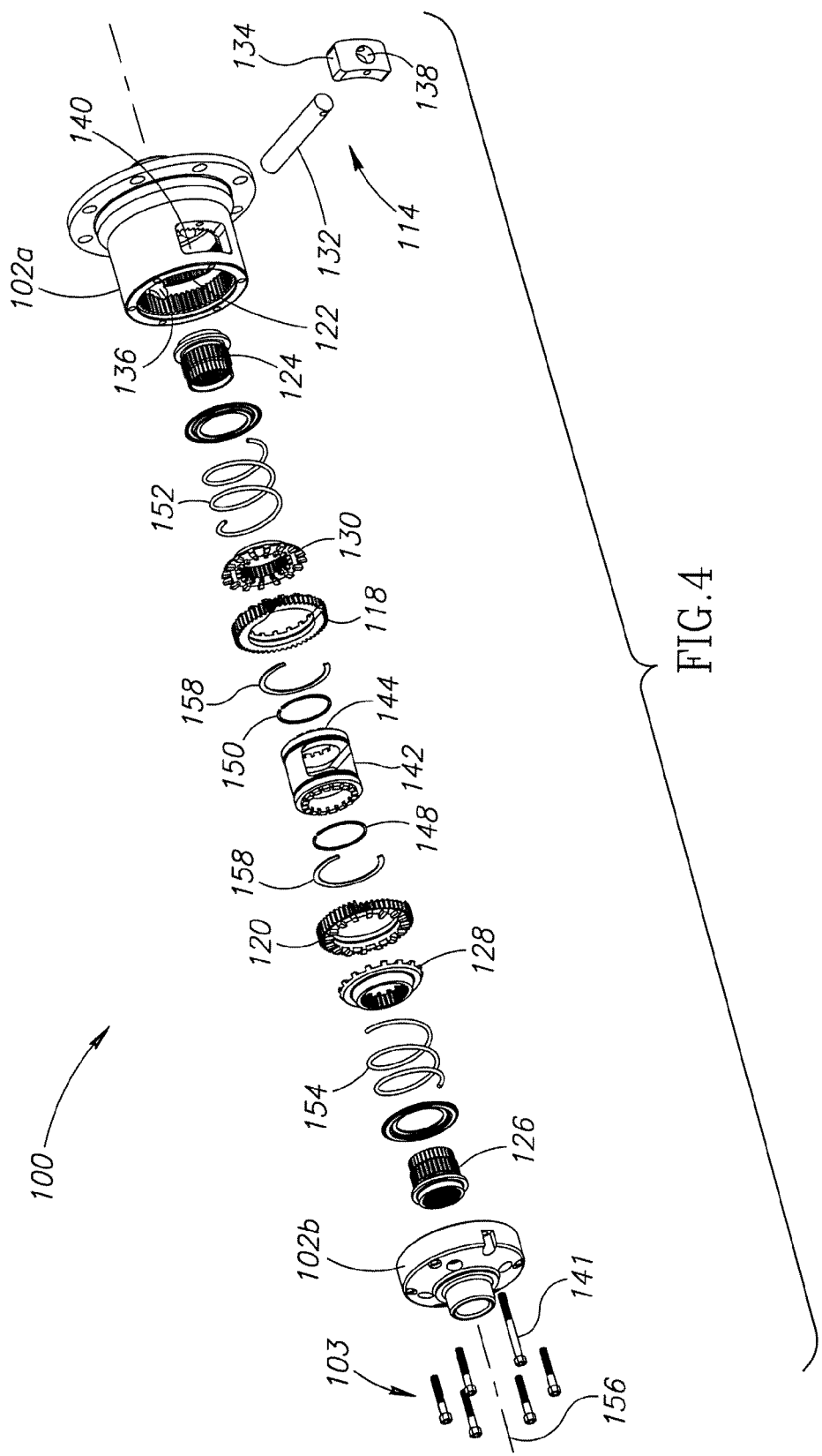
FIG. 4 is an exploded, isometric view showing of the locking differential of FIG. 2.
Figure 5:
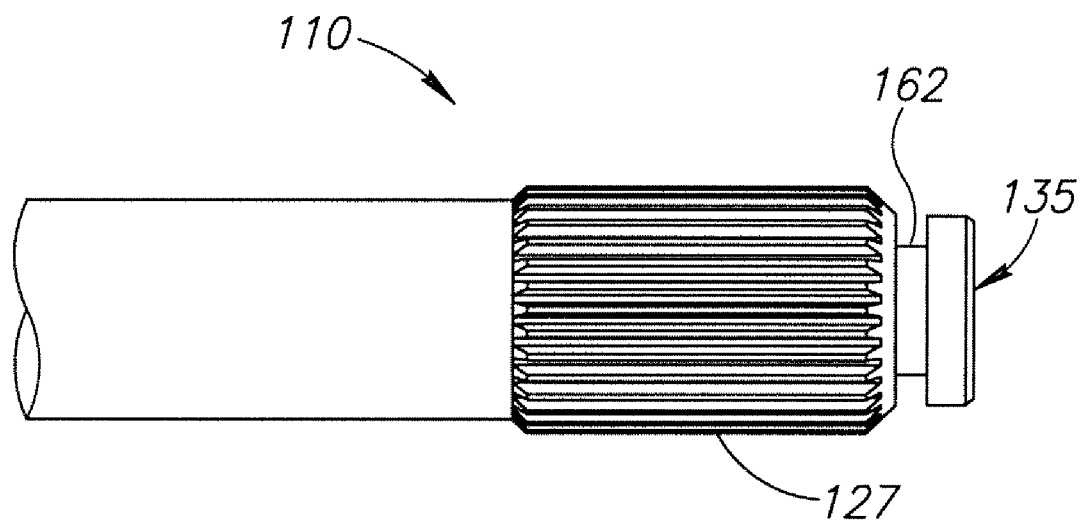
FIG. 5 is a side elevational view of an output shaft extending from the locking differential of FIG. 2 according to an illustrated embodiment of the invention.

Now referring to FIG. 4, the cross pin 132 extends diametrically through an opening 136 in the housing 102 and through an opening 138 in the cross pin support block 134 to secure the assembled components within the interior chamber 122 of the housing 102. In turn, the cross pin support block 134 is sized to be received into a complementary shaped opening 140 formed in the housing 102. In one embodiment, the cross pin assembly 114 is coupled to the housing 102 with an elongated fastener 141 (also shown in FIG. 1). As noted above, the cross pin assembly 114 prevents the output shafts 110, 112 from being axially displaced in the same direction. The cross pin 132 may have a cylindrical body portion that abuts an end surface 135 of the output shaft 110 (FIG. 6) and abuts an end surface (not shown) of the output shaft 112. By configuring the cross pin assembly 114 as separate components, instead of a conventional one-piece pin with an integrally attached head (re: U.S. Pat. No. 5,590,572), which has been reported as being more difficult to manufacture and more costly to replace, the cross pin assembly 114 may be manufactured and provided as an interchangeable component.

The locking differential 100 further includes a center cam member 142 having a key 144, which may take the form of a protuberance or a recess formed in the cam member 142. One purpose of the key 144 is to limit an amount of angular movement of the cam member 142 relative to the split-center driver 116 by cooperation between complementary keys 146 (as best shown in FIG. 9 with respect to the second driver 120) formed on both the first driver 118 (not shown) and the second driver 120. In one embodiment, the key 144 on the cam member 142 takes the form of a recess and the keys 146 on the first and second drivers 118, 120 take the form of a protruding, complementarily shaped member. In another embodiment, the key 144 on the cam member 132 protrudes while the keys 146 on the first and second drivers 118, 120 take the form of recesses. In addition, the center cam member 142 may be coupled to the first and/or second drivers 118, 120 with snap rings 148, 150 to prevent relative axial movement therebetween. Referring back to FIGS. 3 and 4, springs 152, 154 may be used to re-engage the clutch gear members 128, 130 with the drivers 118, 120 when the locking differential 100 is not in an overrunning condition.

Figure 7:
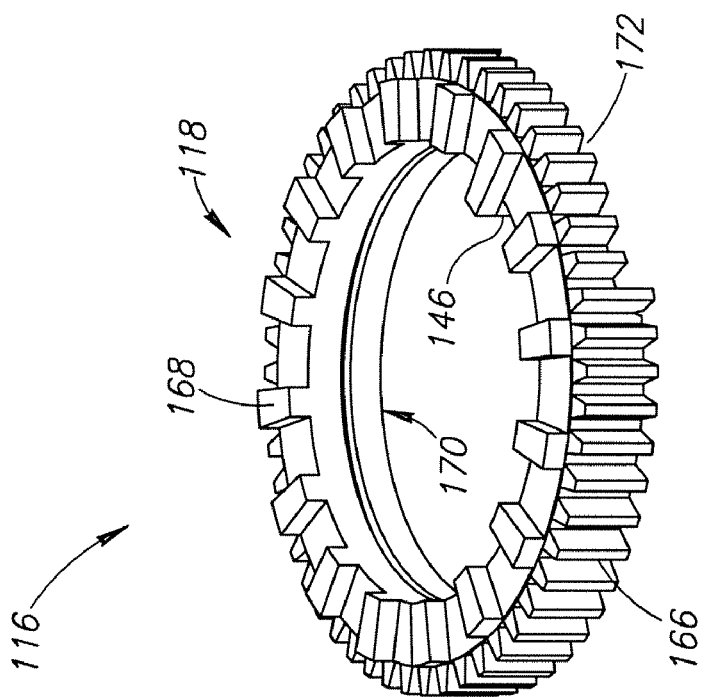
FIG. 7 is a perspective view showing one side of a two-piece split center driver used in the locking differential of FIG. 2 according to an illustrated embodiment of the invention.

Referring now to FIGS. 6 and 7, the output shaft 110 may be restrained from axial displacement (i.e., axial means along a rotational or centerline axis 156 of the locking differential 100) with a clip 158, which may take the form of c-clip, snap ring, or some equivalent coupling mechanism. In the illustrated embodiment, the clip 158 is a c-clip located within a groove 162 formed in the output shafts 110. Although not shown in FIG. 6, the output shaft 112 may be restrained in a similar fashion using a clip identical to clip 158. Accordingly, one purpose of the clip 158 is to prevent relative axial motion between the output shafts 110, 112 and the side gears 124, 126, respectively.

Figure 8:
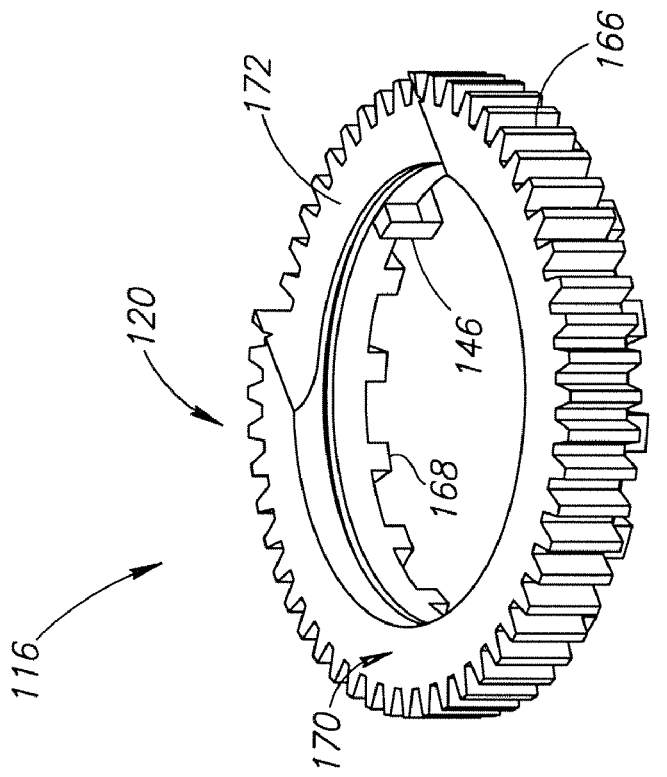
FIG. 8 is a perspective view of an opposite side of the two-piece split center driver of FIG. 7 according to an illustrated embodiment of the invention.

FIGS. 8 and 9 show the split-center driver 116, where FIG. 8 shows the first driver 118 and FIG. 9 shows the second driver 120. In the illustrated embodiment, the split center driver 116 is a two-piece component and as noted above, the first driver 118 is positioned on one side of the cross-pin assembly 114 and the second driver 120 is positioned on the other side of the cross-pin assembly 114. The first and second drivers 118, 120 each include external splines 166, laterally projecting members 168 for engaging the clutch gear members 128, 130, a substantially planar surface 170 located on an opposite side of the driver from the laterally projecting members 168, and a clearance recess 172 formed in the substantially planar surface 170. In one embodiment, the clearance recess 172 is configured to permit access to the clip 158 (FIG. 7) located in a central portion of the locking differential 100 (FIG. 1). Advantageously, the two-piece split-center driver 116 permits easier access and assembly of the locking differential 100 (FIG. 1). In addition, the first and second drivers 118, 120 are less complex to manufacture and may be interchangeable, and thus less costly to maintain in inventory. Consequently, the locking differential 100, as described herein and claimed hereinafter, may operate to eliminate the need for a single or one-piece center driver.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

I claim:

1. A locking differential for driving a pair of output shafts comprising:
    a housing having a main body portion coupled to a removable end portion to define an interior chamber, the pair of output shafts extending in opposite directions from the interior chamber, the main body portion having a radial flange extending from a periphery of the main body portion;
    a pair of side gears positioned within the interior chamber, a first side gear concentrically coupled and rotationally fixed to one of the output shafts and a second side gear concentrically coupled and rotationally fixed to the oppositely extending output shaft;
    a pair of clutch gear members slideably coupled to the side gears, respectively, the pair of clutch gear members axially movable to maintain the locking differential in a disengaged state when the locking differential is in an overrunning condition defined when one output shaft overruns the oppositely extending output shaft by a predetermined amount;
    a cross pin assembly having a cross pin extending through an opening in the main body portion of the housing and having a cross pin support block positioned in a complementary shaped opening in the main body portion of the housing;
    a two-piece split-center driver having a first driver located on a first side of the cross pin assembly proximate the end portion of the housing and a second driver located on a second side of the cross pin assembly proximate the radial flange extending from the main body portion of the housing; and
    a center cam member having an opening to receive the cross pin and c-clips and co-axially aligned with the side gears and clutch gear members, the center cam member operable with the pair of clutch gear members to disengage the side gears from the two-piece center driver when one of the output shafts is in the overrunning condition.

2. The locking differential of claim 1, further comprising:
    a biasing member configured to axially move the clutch gear members into the disengaged state.

3. The locking differential of claim 1, further comprising:
    a hold out ring positioned between the clutch members and center cam for maintaining the side gear in the disengaged state relative to the split-center driver as long as the locking differential is in the overrunning condition.

4. The locking differential of claim 1, further comprising:
a coupling mechanism to prevent axial separation of the output shafts relative to the center cam member.

5. The locking differential of claim 4 wherein the coupling mechanism includes a clip.

6. The locking differential of claim 1 wherein the two-piece split-center driver is rotationally fixed to the housing.

7. The locking differential of claim 1 wherein the two-piece split-center driver includes external splines for engaging complementary internal splines in the housing.

8. The locking differential of claim 1 wherein the two-piece split-center driver is co-axially aligned with the side gears and the clutch gear members.

* * * * *